US00RE33938E

United States Patent [19]

Cuevas

[11] E Patent Number: Re. 33,938

[45] Reissued Date of Patent: May 26, 1992

[54] ASPIRATING/VENTING AIR BAG MODULE ASSEMBLY

[75] Inventor: Jess Cuevas, Scottsdale, Ariz.

[73] Assignee: Talley Automotive Products, Inc., Mesa, Ariz.

[21] Appl. No.: 601,252

[22] Filed: Oct. 19, 1990

Related U.S. Patent Documents

Reissue of:

[64] Patent No.: 4,877,264
Issued: Oct. 31, 1989
Appl. No.: 290,495
Filed: Dec. 27, 1988

[51] Int. Cl.[5] ..... B60R 21/28; B60R 21/30

[52] U.S. Cl. ..... 280/731; 280/734; 280/738; 280/739

[58] Field of Search ..... 280/728, 730, 731, 732, 280/734, 735, 738, 739, 740, 741, 743

[56] References Cited

U.S. PATENT DOCUMENTS

| | | | |
|---|---|---|---|
| Re. 27,860 | 1/1974 | Day | 417/184 |
| Re. 29,228 | 5/1977 | Hass | 280/738 |
| 2,976,907 | 3/1961 | Harvey et al. | 72/56 |
| 3,438,115 | 4/1969 | Humphress et al. | 29/421 |
| 3,552,770 | 1/1971 | Berryman | 280/740 |
| 3,590,464 | 7/1971 | Wildi et al. | 29/421 |
| 3,675,942 | 7/1972 | Huber | 280/738 |
| 3,715,131 | 2/1973 | Hurley et al. | 280/736 |
| 3,727,942 | 4/1973 | Arntson et al. | 280/731 |
| 3,762,741 | 10/1973 | Fleck | 280/729 |
| 3,767,225 | 10/1973 | Mazelsky | 280/729 |
| 3,773,350 | 11/1973 | Shibamoto | 280/729 |
| 3,773,351 | 11/1973 | Catanzarite | 280/738 |
| 3,776,570 | 12/1973 | Weman | 280/738 |
| 3,778,083 | 12/1973 | Hamasaki | 280/739 |
| 3,784,225 | 1/1974 | Fleck et al. | 280/729 |
| 3,788,663 | 1/1974 | Weman | 280/729 |
| 3,791,666 | 2/1974 | Shibamoto | 280/729 |
| 3,791,669 | 2/1974 | Hamilton | 280/738 |
| 3,793,701 | 2/1974 | Chartet | 29/421 |
| 3,819,205 | 6/1974 | Dunford et al. | 280/731 |
| 3,843,152 | 10/1974 | Nonaka | 280/731 |
| 3,848,325 | 11/1974 | Bimba | 29/511 |
| 3,880,447 | 4/1975 | Thorn et al. | 280/740 |
| 3,895,823 | 7/1975 | Stephenson | 280/731 |
| 3,907,330 | 9/1975 | Kondo et al. | 280/731 |
| 3,909,037 | 9/1975 | Stewart | 280/738 |
| 3,910,595 | 10/1975 | Katter et al. | 280/732 |
| 3,917,023 | 11/1975 | DeRosa | 280/735 |
| 3,934,984 | 1/1976 | Marlow et al. | 23/281 |
| 4,131,300 | 12/1978 | Radke et al. | 280/737 |
| 4,178,017 | 12/1979 | Ishi et al. | 280/740 |
| 4,278,638 | 7/1981 | Nilsson et al. | 422/166 |
| 4,722,551 | 2/1988 | Adams | 280/736 |

*Primary Examiner*—Andres Kashnikow
*Assistant Examiner*—Brian L. Johnson
*Attorney, Agent, or Firm*—Tarolli, Sundheim & Covell

[57] ABSTRACT

A motor vehicle modularized airbag assembly adapted for facilitating an aspirating flow of ambient atmosphere through the module and into the air bag to facilitate the inflation thereof and thereafter so as to vent the contents into the surrounding atmosphere. The assembly comprises a pyrotechnic inflator device; and inflatable air cushion in contact relation thereto; a retainer member for facilitating a locking engagement between the air cushion and the inflator and a mounting plate comprising a plurality of stepped levels for receiving the inflator, the air cushion and the retainer member in operative association, as well as a plurality of projecting members formed integral with a lower surface thereof to facilitate the aspirating and venting effect. The assembly additionally comprises an elongated conduit extending rearwardly from the mounting plate, through the vehicle's steering column at least to an aperture in the firewall thereof and optionally beyond, so as to direct the contents of the air bag out of the vehicle's passenger compartment upon deflation of the bag.

20 Claims, 2 Drawing Sheets

FIG. 1
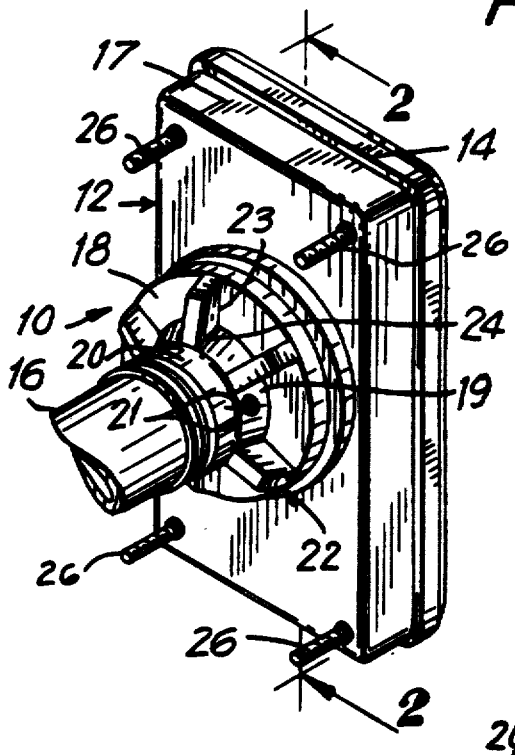
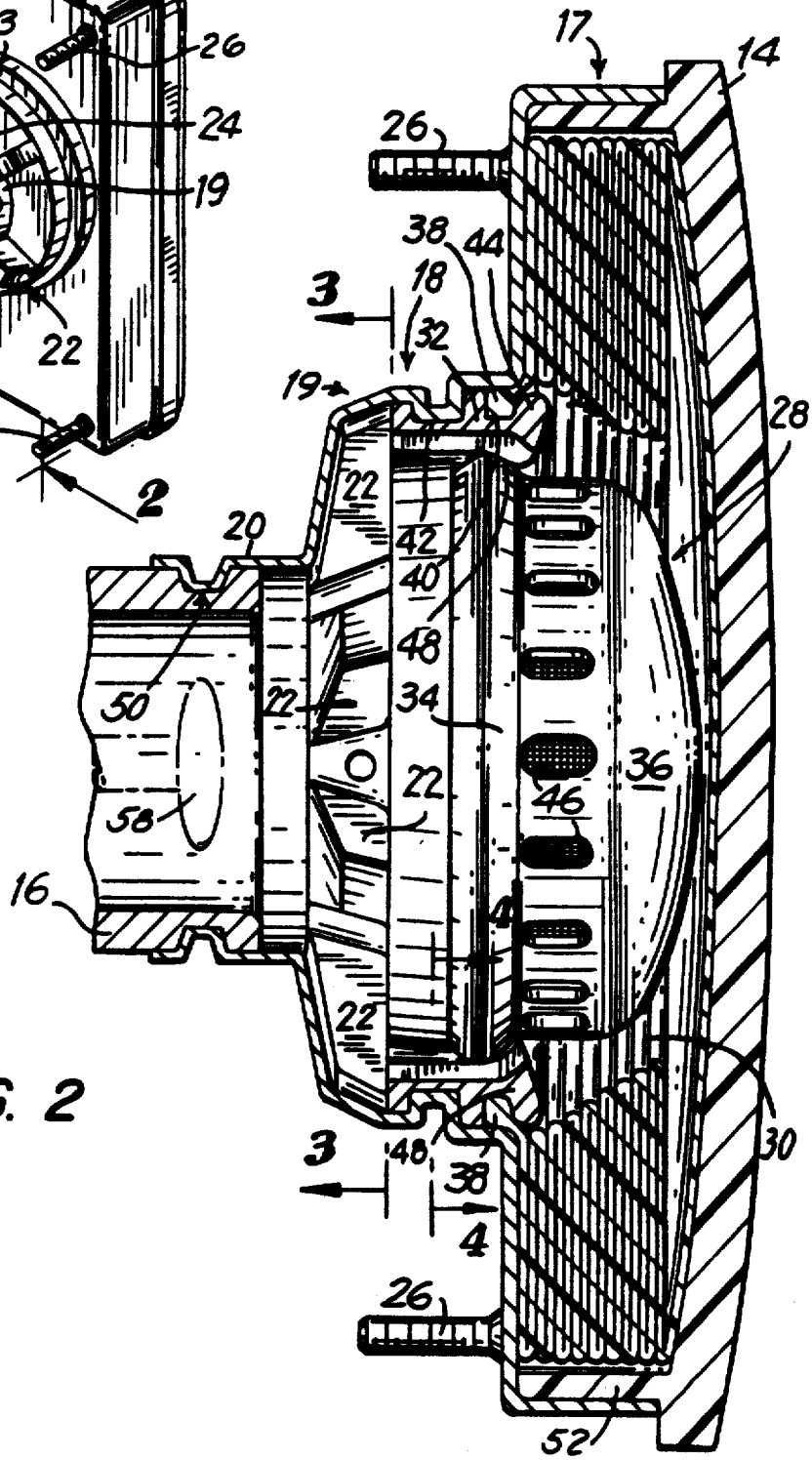
FIG. 2

ASPIRATING/VENTING AIR BAG MODULE ASSEMBLY

Matter enclosed in heavy brackets [ ] appears in the original patent but forms no part of this reissue specification; matter printed in italics indicates the additions made by reissue.

TECHNICAL FIELD

The invention relates generally to a modularized occupant restraint system for installation within a motor vehicle and more particularly to a driver's side air bag module wherein ambient air is initially directed into the air bag together with gaseous combustion products produced by the inflator to facilitate inflation of the bag and further wherein the gaseous contents of the air bag are subsequently vented out of the vehicle's passenger compartment upon deflation of the bag.

BACKGROUND OF THE INVENTION

Since, notwithstanding the availability of voluntary safety devices such as lap and shoulder belts, large numbers of people are killed or maimed annually in motor vehicle accidents wherein the occupants are thrown forwardly within the vehicle so as to collide with the solid interior surfaces thereof, there has been considerable impetus toward the development of motor vehicle passive restraint systems. One system extensively investigated senses rapid deceleration of the vehicle, such as that which occurs upon impact, and initiates inflation of a bag between, for example, the steering wheel and the driver. Inflation of the bag must therefore occur within milliseconds of the impact in order to restrain the driver before he can be thrown against the solid interior surface of the vehicle.

As soon as the initial or primary impact of a crash is completed, it is desirable to deflate the bag so that the driver is not trapped in the vehicle by an inflated bag. Moreover, it is further desirable that the bag be deflated rapidly so that, in the event, for example, of an accidental inflation, the restraint upon the person driving the automobile is sufficiently short that he does not lose control of the vehicle. In order to meet such criteria, the bag must be sufficiently inflated to restrain a passenger in about 30–60 milliseconds after the initiation of inflation and substantially deflated after about 100 milliseconds.

Generally, such passive restraint airbag systems include a pressurized fluid source of any conventional type, i.e. (a) stored gas, (b) a pyrotechnic inflator or (c) a hybrid, i.e, combination system. When the assembly is arranged to protect the driver of the vehicle, the source may be mounted on the steering wheel or the steering column, or it may be mounted remote from either and connected by conduit means to the inflatable cushion. The sensor which actuates the pressurized fluid source is normally mounted remote from the steering apparatus in order to sense impacts received by the vehicle or the probability or possibility of such impacts.

A further advance in the field of passive motor vehicle crash restraints involves the inclusion of aspiration means which draws air from within the vehicle's passenger compartment into the air bag so as to both cool the gas entering the bag from a fluid source such as a pyrotechnic inflator operatively associated therewith and to permit a more rapid inflation of the air bag than would otherwise be possible utilizing only the gas produced by the inflator device.

Various types of aspirating inflators are known and used in the prior art. For example, a number of references disclose arrangements wherein the interior of the bag communicates with the atmosphere within the vehicle's passenger compartment through a unidirectional valve. Such valves permit air from the passenger compartment to enter the interior of the bag, thus facilitating the inflation of the bag, but these valves thereafter prevent the atmosphere within the bag from venting back into the passenger compartment. Examples of air bag systems of the type described above may be found in U.S. Pat. Nos. 3,675,942 to Huber; 3,767,225 to Mazelsky; 3,773,350 and 3,791,666 to Shibamoto; 3,788,663 to Weman; and 3,909,037 to Stewart.

Alternately, a number of references disclosed air bag inflation devices wherein the flow of ambient atmosphere proceeds in two directions, i.e., initially, from the passenger compartment into the air bag and then, subsequent to the collision, gradually back into the passenger compartment so as to facilitate the deflation of the air bag. Air bag devices of this type are found, for example, in U.S. Pat. Nos. 3,762,741 and 3,784,225 to Fleck et al.; 3,773,351 to Catanzarite; 3,843,152 to Nonaka and 3,910,595 to Katter et al.

In a further alternate arrangement, the ambient air from the passenger compartment is initially aspirated into the air bag upon initiation of the system response due to the occurrence of a collision and then the entire contents of the bag, comprising the gaseous products supplied by the inflator in admixture with the ambient atmosphere, is subsequently directed entirely out of the vehicle into the surrounding space. An example of this type of arrangement is illustrated in U.S. Pat. No. Re. 29,228 to Hass (i.e., a reissue of U.S. Pat. No. 3,632,133) wherein the air bag is inflated under the combined influence of a high velocity stream of gas produced by a pyrotechnic gas inflator device and a relatively large volume of air drawn into the bag by the passage of the high-velocity gas. The air may be drawn from outside the vehicle through a conduit assembly extending through the steering column, and subsequently discharged through the same conduit to the outside of the vehicle.

In addition, to facilitate the installation and maintenance of driver's side air bag assemblies, these systems have previously been produced in modular form, as described for example, in U.S. Pat. No. 3,819,205 to Dunford et al. Applicant is unaware, however, of any modularized air bag system which includes means, such as those described above, for aspirating ambient air, either from within or without the passenger compartment of the vehicle, and directing these additional gases into the air bag so as to facilitate the inflation thereof. Moreover, there is additionally no teaching in the prior art to vent the mixture from within the air bag component of such a modularized assembly completely out of the vehicle and into the surrounding space to facilitate deflation of the bag, while also avoiding the generation of an abrupt pressure increase within the vehicle which is known to be injurious to the occupants thereof.

SUMMARY OF THE INVENTION

The present invention thus concerns an improved modularized design for a motor vehicle passive restraint, i.e., air bag, assembly, configured for installation within a variety of motorized vehicles such as automobiles, vans, trucks, etc.

It is an object of the present invention to provide a modularized driver's side air bag system having means to permit the aspiration of exterior air through the module and into the air cushion component, and subsequently to direct a reverse flow of the atmosphere within the bag out of the vehicle's passenger compartment and into the surrounding environment.

It is a further object of the invention to provide a modularized driver's side air bag assembly as described above, adapted for substantially inflating a driver's side air bag by the combustion of a reduced amount of a solid propellant composition relative to that normally required to inflate such a cushion component, due to the cumulative effect of the aspirated air in inflating and deploying the air bag.

It is still a further object of the invention to provide a modularized driver's side air bag assembly as described above, adapted to include a pyrotechnic inflator device of reduced size and weight due to the reduction in the amount of solid propellant required.

It is an additional object of the present invention to provide a modularized air bag passive restraint assembly which may be constructed without the use of fasteners such as bolts or screws which are required in the prior art to maintain the various components of such a device in operative association.

It is a still further object of the invention to provide a modularized air bag system which may be assembled utilizing a minimum number of parts at a reduced number of work stations while, in fact, enhancing the strength of the structural bond formed among the various components.

It is another object of the present invention to design an air bag module assembly configured for the inclusion of a variety of inflator unit designs in which the only critical structural requirement necessary to permit the integration of a particular inflator into the module is a rounded shoulder portion upon the outer periphery of the inflator housing, typically in the zone where the diffuser and closure members are joined together.

The presently claimed module assembly is thus comprised of the following principal components; a pyrotechnic inflator device, a retainer member, an inflatable air bag and a mounting plate, together with an optional elongated conduit extending from the lower portion of the mounting plate for directing the flow of gas into and out of the vehicle's passenger compartment.

With regard to inflator devices proposed for use in applicant's module assembly, these are preferably constructed of a relatively light-weight, corrosion resistant, high tensile strength material, such as aluminum or titanium, or alternatively, certain light-weight stainless steels. Such inflators typically comprise an upper domed diffuser member and a lower closure plate member for sealing the diffuser member, which together form the generator housing. Positioned within the housing is a solid, pyrotechnic gas generating composition to serve as a propellant and a means for igniting the propellant, such as an electrically actuated squib, located adjacent thereto. Interposed between the propellant and the inner surface of the diffuser is a filtering assembly for cooling the gas and removing molten particulates therefrom prior to its discharge through a plurality of exit ports in the diffuser, and into the attached air bag.

The air bag utilized with the present invention is further designed to have a locking bead, which bead is comprised of an elastomeric o-ring capable of a limited degree of expansion and contraction, wrapped by the bag material and subsequently sewn into place in the bag mouth. The locking bead is thus configured and adapted to fit into a first grooved portion along an upper outer peripheral surface of the retainer ring, which, in the assembled module, is positioned circumjacent to the inflator unit within the mounting plate. To effect this engagement, the locking bead is simply stretched over a flanged upper lip portion of the retainer ring. The mouth of the bag is then permitted to contract back into the grooved upper portion of the ring.

Moreover, the flanged upper lip of the retainer ring serves to direct the hot gases and particulates, which exit the diffuser portion of the generator housing through a plurality of diffuser ports situated along the periphery thereof, upwardly into the central portion of the bag cavity and away from the stitched portion of the air bag to prevent damage thereto and thus to avoid a subsequent bag failure.

In addition, the retainer ring is provided with a plurality of slotted aperatures along its inner circumference, passing entirely through the ring from a first (lower) side to a second (upper) opposed side, and which cooperate with corresponding slotted apertures formed in a bage portion of the mounting plate to permit outside air to be aspirated into the air bag. Additionally, a flexible conduit configured and adapted for the reciprocal passage of gas between the exterior of the vehicle and the interior of the air bag cavity may be attached to the rear face of the mounting plate, in operative alignment with the slotted apertures in both the plate and the retainer ring, and extended downwardly through the steering column and optionally out of the passenger compartment, i.e., into the engine compartment or through the floor of the vehicle.

The mounting plate portion of applicant's module is initially formed as an open pan, which is subsequently sealed by a cover adapted to fit thereover, once the inflator air bag and the retaining ring have been locked in place therein. The mounting plate is constructed with several descending levels, or steps, which becomes relatively smaller in size as one proceeds from the open "front" portion of the plate (open, that is, prior to the installation of the cover member) to the closed "rear" portion thereof. The lowermost step is provided as described above with a series of slotted apertures defined by projecting finger members which are formed integrally with the lower surface of the plate. Thus, as noted above, the apertures in the plate correspond to matching apertures defined by the retainer ring. The end effect created by these cooperating apertures is to facilitate the aspiration of ambient air into the bag cavity when the pyrotechnic inflator device is actuated and the subsequent venting of the air bag's contents out of the passenger compartment to facilitate the deflation thereof.

Thus, a combination of the high velocity gases exiting from the diffuser portion of the inflator, together with the effect of the initial bag motion, i.e., the bouncing which occurs when the folded bag is deployed, creates a negative pressure (i.e., a partial vacuum) within the correspondingly aligned apertures, causing air to be ingested through the conduit, then through the corresponding slotted apertures in both the mounting plate and the retainer ring and thereafter into the bag cavity. Once the bag is fully deployed, however, the combination of the gaseous combustion products and the ambient atmosphere within the bag creates a positive pressure therein, thus facilitating a reverse flow of the gas back through the slotted aperatures in the retainer ring and the mounting plate and down through the steering column, to be dumped overboard through the fire wall or the floor of the vehicle to the exterior of the vehicle. As noted above, in the preferred embodiment, the gas travels down a conduit installed within the steering column to prevent it from leaking back into the passenger compartment through apertures formed in the column for the passage of, for example, the gear shift lever and the directional signal control.

Applicant's air bag module is thus quickly and easily assembled in the following sequence: first, the inflator is centered upon a second stepped portion of the mounting plate. Next, the locking bead within the bag mouth is stretched over the flanged upper lip of the retainer ring and thereafter permitted to retract back into the first, i.e., upper, groove thereon. The retainer and bag assembly is then lowered over the diffuser portion of the inflator, which extends upwardly into the forwardmost stepped portion of the mounting plate, until the bottom surface of the retainer ring also rests upon the second step, such that the retainer is positioned circumjacent to the inflator. The bag is then folded or storage within the first stepped portion of the mounting plate and thereafter rests atop the diffuser portion of the inflator housing.

Subsequently, the second stepped portion of the mounting plate is formed into a second grooved portion of the retainer ring which extends along the lower outer portion thereof. This technique permits both the bag and the inflator to be simultaneously locked into position within the mounting plate within a matter of seconds with no need for time-consuming and labor-intensive intermediate fastening steps. Finally, a lower skirt portion of the mounting plate, integral with the rear face of the plate, is formed into a grooved channel located upon the outer surface of the elongated conduit member at one terminal end thereof so as to lock the conduit into position upon the mounting plate.

As can be seen from the present disclosure, therefore, applicant's presently claimed module has a number of advantages over air bag assemblies existing in the prior art. These include:

1. Applicant's air bag becomes filled more quickly and with a cooler gas, due to the introduction of ambient air aspirated therein upon actuation of the inflator;

2. The amount of solid gas generant may be reduced since, due to the aspiration effect, the inflator is required to produce less gas, thus also permitting a reduction in the size and therefore the weight of the inflator component;

3. The contents of the air bag are vented outside the vehicle's passenger compartment, thus preventing an uncomfortable pressure surge within the vehicle which has previously been known to cause injury to vehicle occupants;

4. The opening of the air bag is simplified. The bag remains locked in place at all times a result of the bead configuration;

5. The bag to inflator joint is stronger due to the full 360° contact therebetween;

6. Bag to retainer orientation is unnecessary, i.e., there are no holes pierced in the bag for fastener retention;

7. There is no orientation required between the inflator and the mounting plate since there are no fasteners required for inflator retention; and 8. Applicant's entire module may be assembled in approximately 10 seconds.

BRIEF DESCRIPTION OF THE DRAWINGS

FIG. 1 is a perspective view of an aspirating/venting air bag module assembly constructed according to the present invention;

FIG. 2 is a sectional view taken along line 2—2 of FIG. 1;

DETAILED DESCRIPTION OF THE PREFERRED EMBODIMENTS

Figure 3:
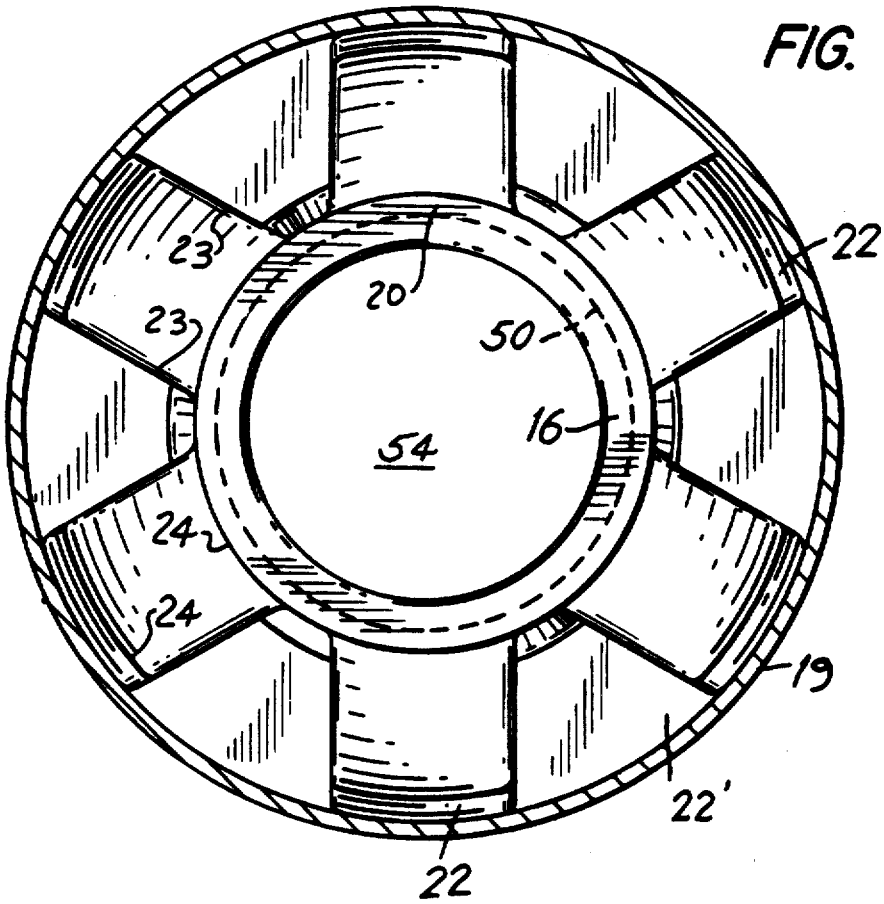
FIG. 3 is a sectional view taken along line 3—3 of FIG. 2.

Referring initially to FIG. 1, there is illustrated the rear face of applicant's aspirating/venting module assembly 10. By "rear", "rearward" or "lower", applicant means that portion of the assembly which faces away from the driver. By extension, therefore, applicant will refer to the "front" or "upper" portion of assembly 10 as the portion closest to the driver of the vehicle. Module 10, as illustrated in FIG. 1, thus externally comprises mounting plate 12, cover member 14 and gas conduit 16.

The recent emphasis on weight reduction for the purpose of fuel conservation in motorized vehicles, has created a need and a demand for a lighter weight passive restraint system. This is of particular importance in a crash protection system for the driver wherein the inflator is mounted on the vehicle's steering wheel. Plate 12 is thus preferably fabricated from a lightweight metal stamping, since this process is both quick and inexpensive. In the preferred embodiment, plate 12 is formed of aluminum in order to minimize the weight of module 10. Moreover, the availability of a lighter weight inflator for installation at this location enables a corresponding reduction to be made in the weight of the vehicle's steering wheel and the steering column on which the inflator is mounted, providing a concurrent improvement in the "steerability" of the automobile.

Cover 14, is formed of a soft, flexible material such as a urethane (e.g., a polyurethane) or an engineering plastic, which is preferably colored and/or decorated, at least on its front face, to enhance the aesthetic appearance of the steering wheel assembly. Cover 14 is preferably maintained in position upon mounting plate 12 either by engaging the upper peripheral edge of plate 12 or by equipping plate 12 along its upper, open end with a double wall thickness, that is, an inner and an outer wall with a space in-between, and forcing a compressible peripheral edge portion of cover 14 into the space between the walls, wherein it is held either by compressing the walls towards each other or by crimping.

In the preferred embodiment, cover 14 is scored, preferably in an H-shape along its front face, to facilitate deployment of the air bag once the inflator is actuated. Thus, in the subject embodiment, cover 14 bursts along the score line as the bag is inflated, forming upper and lower flap portions which are pushed out of the way to permit expansion of the air bag as the combustion of the gas generant proceeds with the inflator.

Mounting plate 12 is preferably configured with a series of stepped portions or zones 17, 18, 19 which are of relatively diminishing size from the front of plate 12 to the rear thereof. Each stepped zone or level serves a different function, i.e., the first and largest step 17 being configured for storing a folded air bag operatively associated with the inflator component; proceeding rearwardly, second step 18 is adapted to support and secure an inflator device, preferably pyrotechnic gas generator; and at the bage of module 10, third zone 19 is provided with lower skirt portion 20, configured to permit plate 12 to be secured to gas conduit 16 so as to provide a flow path for gas to enter and leave module 10 during the inflation/deflation cycle. The outer circumferential wall of zone 19 further defines an aperture adapted for the passage of electrical leads 21 extending from an igniter component within be inflator (now shown) to a remotely located collision device.

Lowermost zone 19 further comprises a series of projecting members 22 extending radially outwardly along the periphery thereof, configured in the shape of elongated rectangles. Each member 22 is formed with two open and two closed sides, wherein the top, i.e., radial edge 23 is formed integral with a bage portion of zone 18 and the innermost axial, i.e., side edge 24, i.e., on that portion of each member 22 most nearly adjacent an upper terminal portion of conduit 16, is formed integral with the wall defining zone 19, thus defining apertures 22, Apertures 22, are adapted to create a gas flow path through module 10 configured for the passage of ambient atmosphere into and through module 10 for facilitating the inflation of the air bag, and subsequently, a reverse flow of the contents of the air bag through module 10 and out of the vehicle's passenger compartment.

Moreover, it is to be understood that the geometric shape adapted for each of stepped zones 17, 18 and 19 is not critical to the operation of the invention. While the shapes illustrated in FIG. 1 are preferred, the various zones may be varied in shape and/or dimension as required due to various design considerations, providing that it is understood that zone 18 must be configured and adapted to accept and support an inflator unit of the type contemplated for use with module 10, as discussed below in further detail.

Plate 12 further comprises, on the rear face thereof, a plurality of stud members 26, preferably four (4) in number, extending perpendicularly to a bage portion of stepped portion 17 for a distance of about one inch. Studs 26 are preferably press fit into each of the four corners of plate 12 and are threaded to permit attachment between module 10 and an underlying frame portion of the vehicle's steering assembly, which attachment procedure will be described below in detail.

Turning now to FIG. 2 there is shown a view, partially in section, of the interior arrangement of component parts within applicant's module 10. These components include pyrotechnic inflator 28, air bag 30 and retainer ring 32, which maintains air bag 30 and inflator 28 in operative association within stepped portion 18 of mounting plate 12.

With regard to inflator 28 chosen for use with applicant's module 10, one important design factor must be taken into account. That is, whereas the internal arrangement of parts within inflator 28 is not a critical feature of the present invention, module 10 does require, in order to ensure an immovable locking engagement between inflator 28 and mounting plate 12, that inflator 28 be formed having a rounded arcuate surface located on at least a portion of its exterior surface as shown, for example, at 34. In the preferred embodiment, shoulder 34 extends completely around the outer periphery of inflator 28 at the juncture of diffuser 36 and the closure member (not shown), which together from the inflator housing. In alternate embodiments, however, a housing for inflator 28 may be formed in a different shape, e.g., a square, rectangle, etc. and/or shoulder 34 may extend along only a portion of the peripheral edge of inflator 28.

Moreover, as noted above, only two inflator devices known to applicant have the requisite external configuration, i.e., shoulder 34 (described below in detail). These devices are described in applicant's copending patent applications entitled LIGHTWEIGHT NON-WELDED INFLATOR UNIT FOR AUTOMOBILE AIRBAGS filed under Ser. No. 233,191 on Aug. 17, 1988 and LIGHTWEIGHT NON-WELDED GAS GENERATOR WITH ROLLED SPUN LIP filed under Ser. No. 246,065 on Sept. 16, 1988, the disclosure of both of which is expressly incorporated herein by reference. Both of these novel inflator types are constructed according to new techniques which do not required the use of welds to maintain the structural integrity of these units. The present invention should not, however, be limited only to use with the two inflators described above or with only non-welded inflators in general, although these are the preferred type.

Applicant's air bag component 30 is folded for storage a top diffuser 36 of inflator 28 within the forwardmost stepped portion 17 of mounting plate 12. Air bag 30 is formed of a durable fabric substrate coated with a layer of plastic, e.g., PVC, or an elastomer to prevent passage of the gaseous fluid therethough. Moreover, bag 30 is designed with locking bead 38, comprising an elastomeric O-ring having a limited degree of flexibility. During the fabrication of bag 30, therefore, bead 38 is wrapped by the bag material and thereafter sewn in place within the mouth of the bag.

Also included in applicant's invention is retainer ring 32 which is formed of a strong, lightweight metal forging, preferably constructed of aluminum due to its relatively low weight. Retainer ring 32 is configured and adapted to fit over and thereafter around inflator 28 so as to rest upon stepped portion 18 of mounting plate 12. Ring 32 is comprised of a first (upper) grooved portion 40, a second (lower) grooved portion 42 and an upper deflector flange 44 positioned above groove 40 for preventing the impingement of hot gases and/or molten particulates produced by the firing of inflator 28 directly upon the sewn portion of bag 30.

Flange 44 thus preserves the integrity of bag 30 during the inflation stage wherein the aforesaid hot gasses and/or molten particulates, produced as result of the combustion of a solid gas generant within inflator 28, would otherwise exit diffuser ports 46 and impinge directly upon the inner surface of bag 30. In the present preferred arrangement, the particulate-containing gasses initially encounter angled flange 44 upon exiting through diffuser ports 46 from inflator 28, and are thereafter directed upwardly and away from the sewn portion of bag 30 toward the center of the bag cavity.

Groove 40, located along the upper outer surface of retainer ring 32, is thus configured to accept locking bead 38. Therefore, after inflator 28 is centered within second stepped portion 18 of mounting plate 12, bead 38 in bag 30 is stretched over deflector flange 44 on ring 32 and then secured within groove 40. The retainer ring and bag assembly is thereafter lowered over inflator 28 such that the lower surface of ring 32 rests on a bage portion of step 18 surrounding the inflator, thus positioning ring 32 circumjacent inflator 28.

Ring 32 is further configured, inwardly from groove 40 upon its upper surface, to engage arcuate surface 34 of inflator 28 so as to lock inflator 28 within mounting plate 12 when the circumferential peripheral wall of step 18 formed into a groove 42 on the lower portion of ring 32. This engagement is facilitated by angled wall portion 48 located along an inner portion of the upper surface of annular ring 32, inwardly adjacent groove 40. Angled wall 48 is thus configured to overlie and abut against shoulder portion 34 of inflator 28 as ring 32 is squeezed inwardly by the forming process.

In addition, as can clearly be seen in FIG. 4 (discussed below), retainer ring 32 is provided along its inner periphery with a plurality of slotted apertures 56 extending entirely therethrough, which overlie apertures 22' defined by corresponding projecting members 22 which extend outwardly from lowermost step 19 of mounting plate 12 so as to permit fluid communication therethrough.

To lockingly engage conduit 16 and mounting plate 12 during the assembly of module 10, the lower skirt 20 of stepped portion 19 is slid over a first open end of tubular conduit member 16 having grooved channel 50 formed around at least a portion of an outer surface thereof. The outer wall of skirt 20 is thereafter formed into groove 50 to lockingly engage mounting plate 12 to conduit 16, thus providing an unobstructed flow path for ambient air to travel, i.e., through conduit 16, into apertures 22' defined by projecting members 22 and thereafter through the slotted apertures 56 in retainer ring 32 and into the interior of air bag 30. Upon deflation of bag 30, the path traveled by the gas is reversed and the bag contents are therefore exhausted out of the passenger compartment into the surrounding atmosphere through conduit 16. Conduit 16 is adapted to fit over the vehicle's drive shaft 58 (shown in phantom) and may terminate at the fire wall of the vehicle or it may preferably extend therethrough into the engine compartment.

Thus, by forming the outer wall of stepped portion 18 into groove 42, a two-fold purpose is served: (1) the beaded portion 38 of bag 30 is locked into position within groove 40 on retainer ring 32, and (2), ring 32 and inflator 28 are also locked into position within mounting plate 12 due to the constriction created by forming the peripheral wall of step 18 into groove 42. The cooperating effect between the arcuate portion 34 on inflator 28 and angled wall portion 48 on the inner surface of ring 32 is therefore required to guarantee that retainer ring 32 will retain inflator 28 within module assembly 10 when applicant's passive restraint device is actuated.

Several of the components of module 10 are thus locked into place simultaneously by a first forming operation which may be performed in a matter of seconds without the need for locating and aligning numerous fasteners such as was previously required by the prior art. A separate second forming operation is subsequently required to lockingly engage skirt 20 on stepped portion 19 into groove 50 on conduit 16.

With regard to the technique referred to above, wherein the peripheral wall of stepped portion 18 is "formed" into lower groove 42 in retainer ring 32 and skirt 20, forming a lower portion of stepped level 19, is formed into groove 50 on the outer surface of conduit 16, applicant utilizes a procedure known as "magnaforming" to effect the requisite connection between the module components. This technique is described, for example, in U.S. Pat. No. 2,976,907 to Harvey et al. (the "'907 patent"), the disclosure of which is incorporated herein by reference.

Applicant has further determined that, with the use of the subject magnaforming technique, the temper of the metal of which the components of module 10 are formed should be as high as possible without being such that the metal cracks during the magnaforming process due to excessive brittleness. This ensures that module 10 may be constructed of lighweight materials, such as aluminum for example, while still maintaining a sufficient degree of structural strength to withstand the forces generated during actuation of inflator 28.

By the use of a magnaforming process, such as that described in the '907 patent, inflator 28 is locked within mounting plate 12 by creating a variable magnetic field outwardly adjacent that part of the outer peripheral wall of stepped portion 18 which overlies lower groove 42. Subsequently, one or more force impulses set up by this force field are focused upon the wall in this area and the effect of these force impulse is to almost instantaneously permit that portion of the wall subjected to such pulses to flow into groove 42 and thus to lock inflator 28, air bag 30 and retainer ring 32 together in a manner of seconds. There is therefore no need to physically contact the peripheral wall of plate 12 in stepped portion 18 with any mechanical device in order to create a strong structural seal between the components of module assembly 10.

In a similar manner, mounting plate 12 is preferably magnaformed into grooved channel 50 extending at least part-way around the outer surface of conduit 16 adjacent an upper terminal end thereon. This technique can serve, if required, to bond two dissimilar materials, as conduit 16 is preferably fabricated from an engineering thermoplastic such as polyvinyl chloride (PVC), but conduit 16 may also be formed of a lightweight metal, such as aluminum, as well. Conduit 16 fits over and around drive shaft 58 within the steering column and extends at least to the fire wall of the vehicle and optionally beyond.

Module assembly 10 additionally comprises, as noted above, a plurality of threaded stud members 26, preferably four (4) in number, which may be press fit into each corner portion on the rear face of stepped portion 17. Studs 26 are approximately one inch in length and are inserted, during installation of module 10 on the vehicle steering assembly, through corresponding apertures defined in an underlying metal frame or "spider" fastened directly to the steering wheel of the vehicle (not shown) below module 10. The subject spider is further configured with a central aperture to permit passage therethrough of conduit 16. Module assembly 10 is thereafter maintained in contact relation with the underlying spider with the use of fastener means such as a weld or locking nuts, which prevent withdrawal of studs 26 from their corresponding aperture in the spider prior to or during operation of inflator 28.

Thus, after magnaforming the component parts of module 10 so as to: (a) lockingly engage bag 30 and inflator 28 within mounting plate 12 by means of retainer ring 32, and (b) magnaforming a structural seal between skirt portion 20 of mounting plate 12 and an upper terminal portion of conduit 16, air bag 30 is neatly folded and placed atop the diffuser portion of inflator 28. Then the completed module assembly is bolted in a single operation to a frame, i.e., the "spider", connected directly to the vehicle's steering assembly. Finally, to complete the assembly, cover member 14, which is preferably pre-scored to facilitate the passage therethrough of air bag 30 upon its deployment during a collision, is snapped into place over the air bag with the aid of flexible members 52 extending perpendicularly therefrom to hide the various components of module 10 from sight and thus to enhance the aesthetic appearance of the vehicle's interior.

FIG. 3 clearly illustrates the arrangement of radially projecting members 22 formed integral with the under surface of mounting plate 12. As can be seen from the illustration, a series of regularly shaped apertures 22; each defined by a projecting member 22, are circumferentially spaced around a centrally located vent 54, to which is secured conduit 16 which extends downwardly therefrom. As described above, apertures 22', defined by radial walls 23 and axial walls 24 forming projecting members 22, are in operative alignment with corresponding slotted apertures 56 (not shown) in retainer ring 32. This permits ambient air carried along by the effect of the negative pressure caused by the generation of gaseous combustion products by inflator 28 to travel upwardly along conduit 16, through aperture 22, defined by plate 12, then through apertures 56 in the retainer ring and thereafter into the air bag, together with the gaseous combustion products produced during actuation of gas generator 28.

The introduction of this ambient atmosphere provides several advantages to the operation of applicant's modularized air bag system. First, the external air is substantially cooler than the gasses produced by inflator 28 and it thus serves to cool the entire contents of bag 30. This feature is important in that if bag 30 of applicant's module 10 were to rupture or, due to some malfunction, to accidentally vent into the passenger compartment, the gases thus released would exit bag 30 at a temperature calculated to prevent injury to the vehicle occupants. Secondly, the inclusion of the additional gas volume provided by the entry of the external environment permits bag 30 to be inflated within a relatively shorter period than was heretofore possible. This aspiration effect additionally permits a reduction of about 15–20 weight percent in the amount of propellant utilized to inflate bag 30 and thus a concurrent reduction in the size, and therefore the weight, of inflator 28 utilized with module 10.

Moreover, as a result of the impact of the driver upon the outer surface of bag 30 upon a collision involving the vehicle, bag 30 begins immediately to deflate. Rather than directing the entire volume of bag 30 into the vehicle's passenger compartment, as commonly practiced in the prior art, applicant's module assemble 10 directs the gaseous contents of bag 30, now under a positive pressure attributable to its confinement within the enveloping bag, back through the slotted apertures 56 in retainer ring 32 and corresponding apertures 22, in projecting members 22 and thereafter out of the passenger compartment through conduit 16. This prevents a potentially hazardous build up of pressure within the vehicle which may, if left unchecked, cause hearing damage or other negative physiological symptoms among the occupants of the vehicle.

Figure 4:
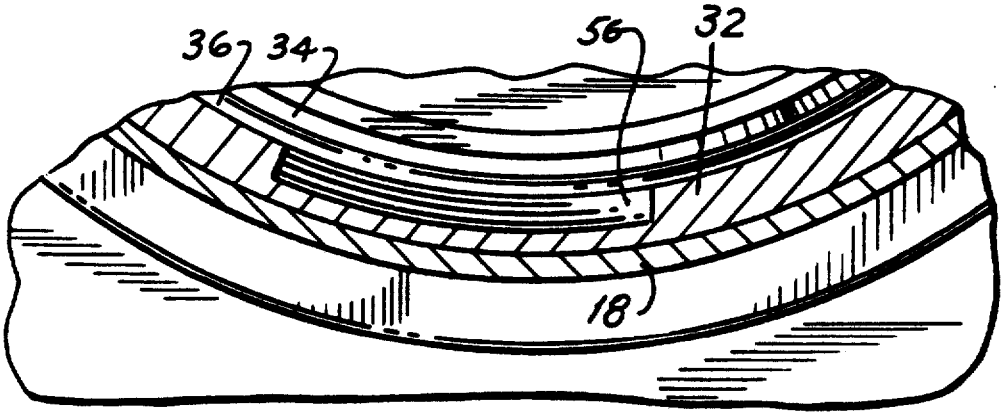
FIG. 4 is a sectional view taken along line 4—4 of FIG. 2.

FIG. 4 provides a sectional view through lower groove 40 in retainer ring 32 illustrating apertures 56 therein. As may be seen from the illustration, the magnaforming technique utilized by applicant produces a continuous, even flow of the outer metal wall of stepped portion 18 into groove 40. Thus the wall is completely conformed to the shape of groove 40. The magnaforming process thus deforms the substantially vertical wall and leads to the formation of upper 18a, and lower 18b shoulder portions, separated by groove 40 with the wall of plate 12 formed therein. As noted above, this procedure effectively locks plate 12 and ring 32 together which, in turn, maintains inflator 28 in position within module 10 due to the pressure of angled wall portion 48 against rounded shoulder portion 34 of the inflator.

While it is apparent that the invention herein disclosed is well calculated to fulfill the objectives stated above, it will be appreciated that numerous modifications and embodiments may be devised by those skilled in the art. It is intended that the appended claims cover all such modifications and embodiments as fall within the true spirit and scope of the present invention.

I claim:

1. An airbag module adapted for installation within a motor vehicle steering assembly, said module comprising:

(a) means for mounting a pyrotechnic gas inflator device upon a steering wheel portion of said steering assembly, said inflator device capable of producing a sufficient amount of a gaseous combustion product within a sufficient time to substantially deploy an inflatable air cushion located in contact relation therewith within an interval between a primary collision between said motor vehicle and an object external thereto and a secondary collision between an operator of said motor vehicle and an interior portion thereof, said mounting means comprising open pan means for supporting said pyrotechnic inflator device, said pan means having several stepped levels extending rearwardly thereon, wherein each said level has a substantially unvarying depth at any point thereon and is positioned directly over a next rearward one of said levels, said levels correspondingly decreasing in volume from front to rear upon said mounting means;

(b) first means, formed integral with a lower portion of said mounting means, for permitting a reciprocal flow of a quantity of surrounding ambient atmosphere from outside said motor vehicle through said mounting means and into said inflatable air cushion upon actuation of said inflator device to facilitate rapid inflation of said air cushion and to permit cooling of said gaseous combustion products produced by said inflator and, subsequent to said primary collision, to permit the contents of said air cushion to flow out of said interior portion of said motor vehicle to the surrounding atmosphere;

(c) a pyrotechnic inflator device positioned within said mounting means, said inflator device comprising a housing formed of a diffuser member having a first open end and a second closed end, and a closure plate member sealing said open end thereof, said housing further comprising an arcuate surface extending along at least a portion of an exterior peripheral surface thereof, said arcuate surface having a relatively greater diameter then a remaining portion of said housing and wherein said surface is configured and adapted to permit a locking engagement of said inflator device within said mounting means;

(d) means for retaining said inflatable air cushion in a contact relation with said inflator device, said retaining means having a first upper grooved portion and a second lower grooved portion extending along at least a portion of an order surface thereof, wherein said retaining means is installed within said mounting means in surrounding relation to said diffuser member and configured to correspond to a portion of said arcuate surface thereof; and (e) an inflatable air cushion in contact relation with said diffuser member of said inflator device, said cushion configured and adapted for preventing injury to said vehicle operator due to contact with said interior portion of said vehicle upon the occurrence of said primary collision, said cushion comprising means located within a mouth portion thereof configured to facilitate a locking engagement between said cushion and a first grooved portion upon an outer surface of said retaining means upon assembly of said module, wherein at least a portion of said mounting means is lockingly engaged within said second grooved portion of said retaining means forming a structural seal therebetween such that said inflator device, said retaining means and said inflatable air cushion are all maintained together in locking engagement with one another within said mounting means without the use of any additional locking means.

2. The module of claim 1 wherein said mounting means is a metal stamping comprising, in series, a first, a second and a third stepped level extending rearwardly thereon, each said level completely overlying a next rearward one of said levels, wherein said first and said second levels each comprise a base portion and an integral peripheral wall portion formed substantially perpendicular to said base portion, each said peripheral wall extending entirely around said corresponding level and being of a substantially unvarying width therealong such that said first and second levels each have a substantially constant depth at any point thereon.

3. The module of claim 2 wherein said third stepped level comprises an outer peripheral wall formed integral with and substantially perpendicular to said bage of said second stepped level, and extending rearwardly from said peripheral wall of said third level, a metal skirt configured and adapted for locking engagement with second means adapted for permitting a receprocal fluid flow between said inflatable air cushion and said surrounding atmosphere.

4. The module of claim 3 wherein said second reciprocal fluid flow means comprises an elongated conduit having a first and a second end, said first end being lockingly engaged within said skirt on said third level of said mounting means, wherein said conduit extends rearwardly from said mounting means such that said second end thereof extends at least to a corresponding aperture defined within a firewall of said vehicle.

5. The module of claim 4 wherein said conduit is formed from a material selected from an engineering thermoplastic and a lightweight, high tensile strength metal.

6. The module of claim 4 wherein said conduit is sized to fit within a steering column of said motor vehicle and extends therethrough to at least said firewall aperture.

7. The module of claim 4 wherein said first end said conduit is lockingly engaged within said skirt portion by a structural seal formed therebetween, said seal created by magnaforming a peripheral wall portion of said skirt into an open channel extending along at least a portion of an outer surface of said first end.

8. The module of claim 3 wherein said first reciprocal fluid flow means comprises a plurality of radially projecting members formed integral with a lower surface of said mounting means adjacent said second and said third stepped levels, each said projecting member defining an aperture through said mounting means, said aperture configured and adapted to initially permit a flow of said ambient atmosphere into said inflatable air cushion upon actuation of said inflator device and subsequently to allow said air cushion to vent the contents thereof therethrough to said atmosphere surrounding said motor vehicle upon deflation of said air cushion.

9. The module of claim 8 wherein each said projecting member comprises:

(a) pair of opposed planar side walls, each said side wall having a first axial and a first radial side and a second axial and a second radial side such that said first axial side of each said wall is formed integral with a portion of said outer peripheral wall of said third stepped level adjacent a corresponding gas passage aperture defined thereby and said first radial side of each said wall is formed integrally with said bage portion of said second stepped level;

(b) a floor member extending substantially perpendicularly from said third stepped level, rearwardly of said gas passage aperture and formed integral with said peripheral wall of said third stepped level, said floor member having first and second longitudinal side edge portions wherein said first side edge is formed integral with said second radial side of one said wall and said second side edge is formed integral with said second radial side of said other wall; and an axially extending closure member having an upper edge and a lower edge and first and second side edge portions, said upper edge formed integral with said bage portion of said second stepped level, said lower edge formed integral with said floor member and said first and second side edge portions formed integral with said second radial surface of, respectively, said first and said second side walls, such that said projecting members each define a gas flow path configured to permit entry of said ambient atmosphere into said inflatable air cushion upon actuation of said inflator device and thereafter to facilitate venting of said air cushion contents through said second reciprocal fluid flow means to the atmosphere surrounding said motor vehicle.

10. The module of claim 1 wherein said retaining means is a ring shaped member configured with a plurality of slotted apertures extending entirely therethrough, from a first lower surface to a second upper surface thereof, said slotted apertures capable of alignment with said first reciprocal fluid flow means to facilitate aspiration of said ambient atmosphere into said inflatable air cushion and subsequent venting of said air cushion contents to said surrounding atmosphere.

11. The module of claim 3 wherein said mounting means is lockingly engaged within said second grooved portion of said retaining means by a structural seal formed therebetween; said seal created by magnaforming [a] *said peripheral wall* portion of said [metal skirt] *second stepped level* upon said mounting means such that *a part of* said [skirt portion] *wall portion* is formed into said second grooved portion.

12. The module of claim 1 wherein said arcuate surface upon said pyrotechnic inflator device is a rounded shoulder located upon a portion of said inflator wherein said diffuser member overlaps said closure plate member.

13. An airbag module adapted for installation within an automobile steering wheel, said modular comprising:

(a) a mounting plate for securing a pyrotechnic inflator device within said module, said mounting plate formed of a metal stamping comprising an open pan having, in series, a first, a second and a third stepped level extending rearwardly thereon, each said level having a substantially unvarying depth at any point thereon and positioned directly over a next rearward one of said levels, said levels correspondingly decreasing in volume from said first to said third level, wherein said first and said second levels each comprise a bage and an integral peripheral wall portion formed substantially perpendicular thereto, each said peripheral wall extending entirely around said corresponding level and having a substantially unvarying width, said third level comprising an outer peripheral wall portion formed integral with and substantially perpendicular to said bage of said second stepped level and, extending rearwardly from said peripheral wall defining said third level, a metal skirt configured and adapted for locking engagement with a conduit extending rearwardly therefrom to at least a corresponding aperture defined within a firewall portion of said automobile, said conduit configured and adapted for permitting a reciprocal fluid flow between an inflatable air cushion operatively associated with said module and the atmosphere external to said automobile;

(b) a plurality of radially projecting members formed integral with a lower surface of said mounting means adjacent said second and said third stepped levels, each said projecting member comprising (i) a pair of opposed planar side walls, each said side wall having a first axial and a first radial side and a second axial and a second radial side such that said first axial of each said wall is formed integral with a portion of said outer peripheral wall of said third stepped level adjacent a corresponding gas passage aperture defined thereby and said first radial side of each said wall is formed integrally with said bage portion of said second stepped level;

(ii) a floor member extending substantially perpendicularly from said third stepped level, rearwardly of said gas passage aperture and formed integral with said peripheral wall of said third level, said floor member having first and second longitudinal side edge portions wherein said first side edge is formed integral with said second radial side of one said wall and said second side edge is formed integral with said second radial side of said other wall; and (iii) an axially extending closure member having an upper edge and a lower edge and first and second side edge portions, said upper edge formed integral with said bage portion of said second stepped level, said lower edge formed integral with said floor member and said first and second side edge portions formed integral with said second radial surface of, respectively, said first and said second side walls, such that said projecting members each define a gas flow path configured to permit entry of said ambient atmopshere into said inflatable air cushion upon actuation of said inflator device and thereafter to facilitate venting of said air cushion contents through said second reciprocal fluid flow means to the atmosphere surrounding said motor vehicle;

(c) an elongated conduit formed from a material selected from an engineering thermoplastic and a lightweight, high tensile strength metal, said conduit having a first end and a second end and being configured and adapted to permit a reciprocal flow of fluid between said inflatable air cushion and said external atmosphere, wherein said first end of said conduit is lockingly engaged within said skirt portion of said mounting plate by a structural seal formed therebetween, said seal created by magnaforming a peripheral wall portion of said skirt into an open channel extending along at least a portion of an outer surface of said first end, said conduit sized to fit within a steering column of said automobile so as to extend rearwardly through said steering column from said mounting plate such that said second end thereof extends at least to a corresponding aperture defined within a firewall of said automobile, wherein said conduit is configured and adapted to permit a reciprocal flow of fluid between said inflatable air cushion and said external atmosphere;

(d) a pyrotechnic inflator device positioned within said mounting means, said inflator device comprising a housing formed of a diffuser member having a first open end and a second closed end, and a closure plate member sealing said open end thereof, said housing further comprising a rounded shoulder extending along at least a portion of an exterior peripheral surface thereof, said shoulder adapted to permit a locking engagement of said inflator device within said mounting means;

(e) a retaining member for maintaining said inflatable air cushion in contact relation with said inflator device, said retaining member having a first upper groove and a second lower groove extending along at least a portion of an outer surface thereof, wherein said retaining member is adapted for installation within said mounting plate in surrounding relation to said diffuser member and configured to correspond to an external shape thereof and wherein said retaining member has a plurality of slotted apertures extending entirely therethrough from a first lower surface to a second upper surface thereof, each said slotted aperture capable of being aligned, upon installation of said retaining member within said mounting plate, with one of said radially projecting members on said lower surface of said plate adjacent said second and said third stepped levels to permit said reciprocal fluid flow between said inflatable air cushion and said external atmosphere;

(f) an inflatable air cushion in contact relation with said diffuser member of said inflator device, said cushion configured and adapted for preventing injury to said vehicle operator due to contact with an interior portion of said vehicle upon the occurrence of a primary collision, said cushion comprising means located within a mouth portion thereof configured to facilitate a locking engagement between said cushion and a first grooved portion upon an outer surface of said retaining means upon assembly of said module, wherein at least a portion of said mounting plate is lockingly engaged within said second grooved portion of said retaining member such that said inflator device, said retaining member forming a structural seal therebetween and said inflatable air cushion are all maintained together in locking engagement with one another within said mounting plate without the use of any additional locking means.

14. The module of claim 13 which further comprises means for covering said open portion thereof, said covering means configured and adapted to engage at least a portion of an upper peripheral surface of said mounting plate.

15. The module of claim 14 wherein said covering means is a cover member formed of a relatively flexible material selected from a urethane and an engineering plastic, said cover member comprising a substantially planar top portion having first and second opposed surfaces and at least one means for lockingly engaging said mounting plate, said locking means formed integral with and extending substantially perpendicularly from said second surface of said top portion.

16. The module of claim 15 wherein said top portion of said cover member is scored along at least a portion of said first surface thereof to facilitate deployment of said air bag upon actuation of said pyrotechnic inflator device.

17. A method for making an automobile airbag module adapted for a reciprocal fluid flow between an atmosphere external to said vehicle and a cavity defined by an inflatable air bag operatively associated with said module, said method comprising:

(a) positioning a pyrotechnic inflator device within means for mounting said inflator within said module, said mounting means comprising an open pan having, in series, a first, a second and a third stepped level extending rearwardly therefrom, and first means, formed integral with a lower surface of said mounting means, for permitting a reciprocal flow of fluid between said inflatable air bag and said external atmosphere, wherein said inflator device comprises along at least a portion of an outer peripheral surface thereof, an arcuate surface extending outwardly therefrom, said arcuate surface having a relatively greater diameter than a remaining portion of said device;

(b) securing a relatively flexible locking bead within an open mouth portion of said air bag;

(c) stretching said locking bead over an upper portion of a retaining member and into a first upper grooved portion defined thereby to form a retainer/bag assembly, said retaining member configured for installation adjacent said inflator device upon said mounting plate, in surrounding relation thereto;

(d) lowering the retainer/bag assembly over at least an upper diffuser portion of said inflator device;

(e) forming a first structural seal between a peripheral wall portion of said second stepped level upon said mounting plate and a second lower grooved portion of said retaining member, said second grooved portion situated relatively rearwardly from a first grooved portion;

(f) inserting a first end of an elongated conduit member into an aperture defined by said third stepped level of said mounting means, said conduit member configured and adapted to form second means for facilitating a reciprocal fluid flow between said inflatable air bag and a surrounding atmosphere external to said automobile;

(g) forming a second structural seal between said first end of said conduit member and said third stepped level of said mounting means;

(h) folding said air bag for storage within said first stepped portion of said mounting means, upon an upper diffuser portion of said inflator device; and (i) securing a cover member to an upper peripheral portion of said mounting means, said cover member configured to conceal said retainer/bag assembly from view and to enhance the aesthetic appearance of said module.

18. The method of claim 17 wherein said first structural seal is produced by magnaforming a peripheral wall portion of said second stepped level such that said wall portion is formed into said second lower grooved portion upon said retaining member.

19. The method of claim 17 wherein said second structural seal is produced by magnaforming a peripheral wall portion of said third stepped level such that said wall portion is formed into a groove extending at least partially around said first end of said conduit member.

20. The method of claim 17 which further comprises installing said module upon a steering assembly of said automobile wherein said conduit member is passed through a steering column portion thereof and extends at least to an aperture defined by a firewall of said automobile.

* * * * *

UNITED STATES PATENT AND TRADEMARK OFFICE

CERTIFICATE OF CORRECTION

PATENT NO. : RE 33,938

DATED : May 26, 1992

INVENTOR(S) : Jess Cuevas

It is certified that error appears in the above-indentified patent and that said Letters Patent is hereby corrected as shown below:

Column 13, Line 43, Claim 3, change "bage" to --base--.

Column 13, Line 47, Claim 3, change "receprocal" to --reciprocal--.

Column 13, Line 65, Claim 7, insert --of-- after end.

Column 14, Line 25, Claim 9, change "bage" to --base--.

Column 14, Line 39, Claim 9, change "bage" to --base--.

Column 14, Line 65, Claim 11, delete "[a]" do not italicize "said peripheral wall", delete "[metal".

Column 14, Line 66, Claim 11, delete "skirt]", do not italicize "second stepped level".

UNITED STATES PATENT AND TRADEMARK OFFICE

CERTIFICATE OF CORRECTION

PATENT NO. : RE 33,938

DATED : May 26, 1992

INVENTOR(S) : Jess Cuevas

It is certified that error appears in the above-indentified patent and that said Letters Patent is hereby corrected as shown below:

Column 14, Line 67, Claim 11, do not italicize "a part of", delete "[skirt portion]", do not italicize "wall portion".

Column 15, Line 18, Claim 13, change "bage" to --base--.

Column 15, Line 25, Claim 13, change "bage" to --base--.

Column 15, Line 43, Claim 13, insert --side-- after axial.

Column 15, Line 47, Claim 13, change "bage" to --base--.

Column 15, Line 61, Claim 13, change "bage" to --base--.

Signed and Sealed this

Fourteenth Day of September, 1993

Bruce Lehman

*Attest:*

BRUCE LEHMAN

*Attesting Officer*

*Commissioner of Patents and Trademarks*